Dec. 20, 1966  F. F. OEHME ET AL  3,292,418
METHOD AND APPARATUS FOR TESTING PRINTING PAPER FOR BLISTERING
Filed June 4, 1964  3 Sheets-Sheet 1

INVENTORS:
Frank F. Oehme
John B. Kahoun
By Gary, Parker, Juettner & Cullinan
Attys

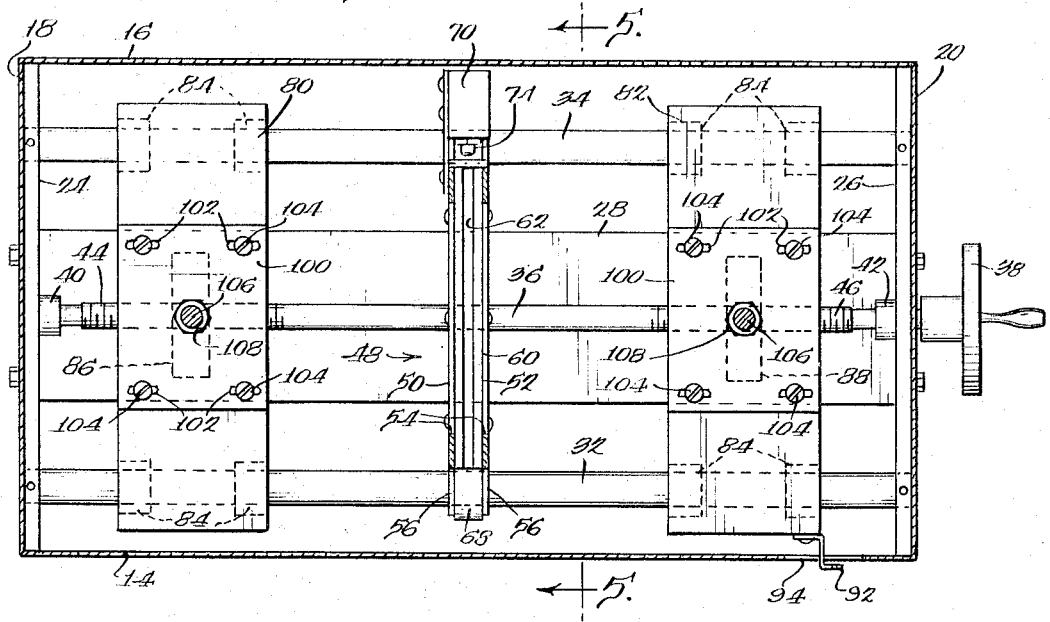
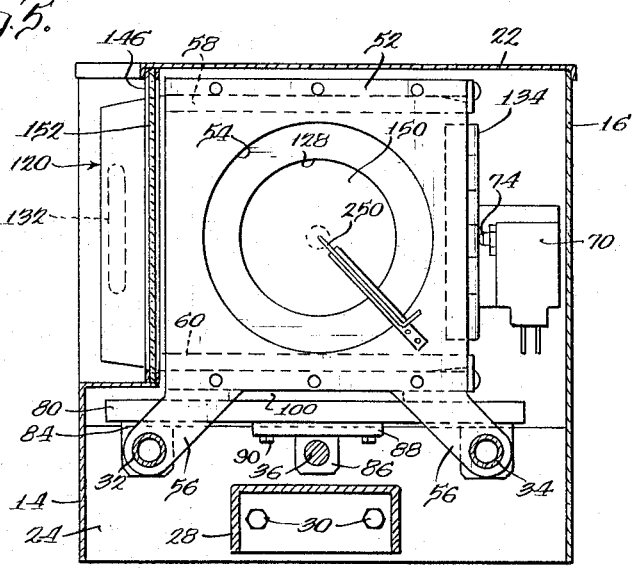

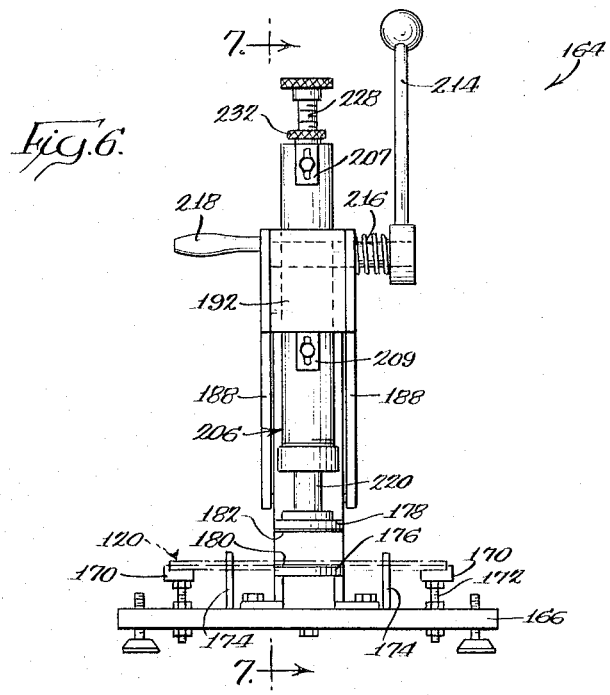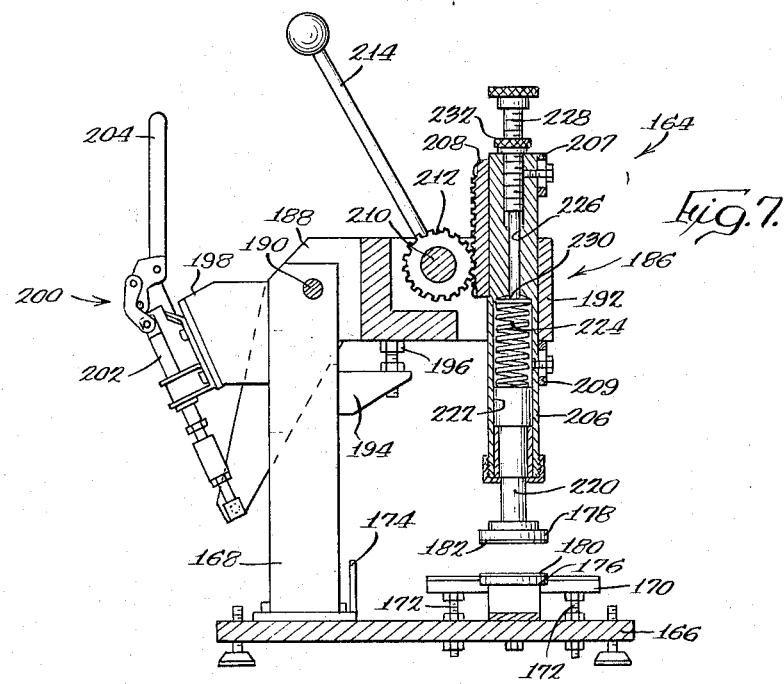

3,292,418
METHOD AND APPARATUS FOR TESTING PRINTING PAPER FOR BLISTERING
Frank F. Oehme and John B. Kahoun, Wisconsin Rapids, Wis., assignors to Consolidated Papers, Inc., Wisconsin Rapids, Wis., a corporation of Wisconsin
Filed June 4, 1964, Ser. No. 372,528
12 Claims. (Cl. 73—15)

The present invention relates to a method of and apparatus for testing printing paper for blistering as may occur when freshly printed paper is exposed to elevated temperatures for drying.

In paper printing operations, the paper is printed with ink and then dried. The drying equipment employed with printing presses commonly consists of a gas fired oven through which the printed sheet or web is conducted. When the freshly printed sheet is suddenly exposed to high temperatures, gaseous compounds are generated which in escaping may cause a rupture in the sheet. This phenomenon is termed blistering.

The object of the present invention is to provide a method of and apparatus for evaluating the blistering characteristics or blister resistance of printing papers prior to printing. More particularly, it is an object to provide a test method and apparatus that stimulate the conditions encountered in drying equipment employed with printing presses, to furnish reliable advance indications of blistering characteristics.

Another object is to provide a method of and apparatus for blister testing which provide consistent precise test results.

A further object is to provide testing apparatus which is simple in construction and operation while providing long continued service with consistent accurate test results, and which may be operated routinely by technicians.

A particular object is to provide a test method which includes the steps of applying a predetermined film of ink over an area of a sheet of paper under a predetermined pressure, exposing the inked area to heat of constant predetermined intensity, and continuing the exposure until blistering occurs.

Another particular object is to provide test apparatus which includes a sample sheet holder, a support for removably mounting the holder for exposure to a heat source, and means for controlling and/or timing the exposure to afford an indication of blister resistance.

These and other objects and advantages of the invention will become apparent in the following detailed description.

Now, in order to acquaint those skilled in the art with the manner of making and using our test apparatus and practicing our new test method, we shall describe, in connection with the accompanying drawings, a preferred embodiment of our apparatus and the preferred manner of making and using the same.

In the drawings:

FIGURE 4 is a longitudinal horizontal section of the apparatus taken substantially on line 4—4 of FIGURE 2;

FIGURE 5 is a transverse vertical cross-section taken substantially on line 5—5 of FIGURE 4;

FIGURE 6 is a front view of a device for inking a sample sheet; and

FIGURE 7 is a side view of said device, partly in elevation and partly in section taken along line 7—7 of FIGURE 6.

Figure 1:
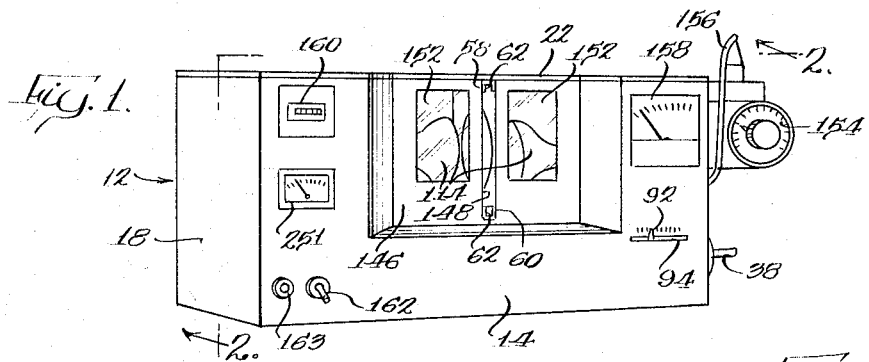
FIGURE 1 is a perspective view of the preferred embodiment of the testing apparatus.
Figure 2:
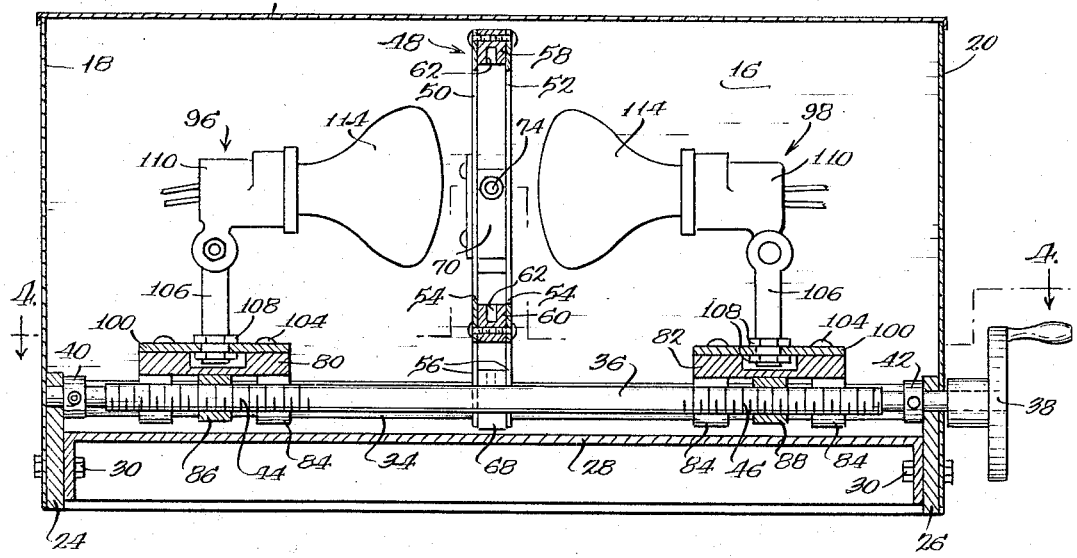
FIGURE 2 is an enlarged longitudinal vertical section thereof, taken substantially on line 2—2 of FIGURE 1.
Figure 3:
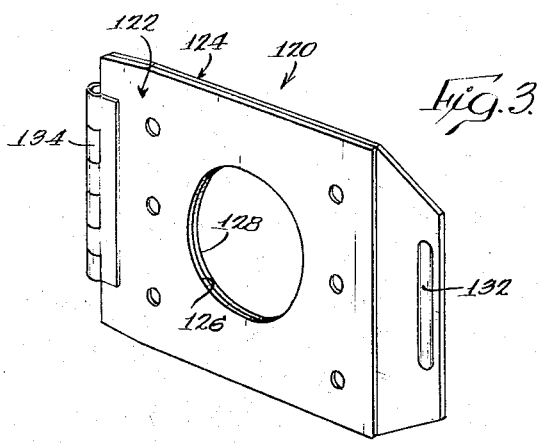
FIGURE 3 is a perspective view of a sample sheet holder mountable in the apparatus.

Referring to the drawings, particularly FIGURES 1-5, a preferred embodiment of our test instrument includes a generally rectangular cabinet 12 having upstanding front and back walls 14 and 16 and end walls 18 and 20. A horizontal top wall 22 is removably mounted on the upstanding walls. Mounting plates 24 and 26 are mounted on the inner surfaces of the respective end walls at their lower ends. A beam or brace 28 extends horizontally between the mounting plates, and the beam and the plates are secured to the end walls by bolts 30.

Two spaced parallel horizontal guide rods 32 and 34 extend between the mounting plates 24 and 26 adjacent the respective front and back walls 14 and 16. An adjusting screw 36 is rotatably mounted on the mounting plates between the guide rods; one end of the screw being journalled in one mounting plate 24 and terminating at the end wall 18 and the other end thereof being journalled in the other mounting plate 26 and extending through the wall 20 for reception of a hand wheel 38. Collars 40 and 42 are fixed to the adjusting screw adjacent the respective mounting plates 24 and 26, to secure the screw against longitudinal or axial displacement while accommodating rotation thereof by the hand wheel. The screw is provided with respective right- and left-hand threads 44 and 46 adjacent its ends.

An upstanding holder supporting frame 48 extends transversely of the cabinet midway between the end walls 18 and 20. The support includes spaced parallel vertical sides 50 and 52, each having a central circular opening 54 and a pair of downwardly and outwardly diverging legs 56. The sides are separated by upper and lower spaced parallel horizontal guide bars 58 and 60, each of which has a groove 62 therein for slidable reception of a sample holder.

Each of the legs 56 is formed with a circular opening for reception of a respective one of the guide rods 32 and 34 and a tubular collar 68 is disposed between each adjacent pair of legs for mounting the support at a fixed location on the guide rods. A control microswitch 70 is mounted adjacent to the back edge of the support 48, i.e., adjacent the back wall of the cabinet, and the switch pin or button 74 thereof is aligned with the holder receiving grooves 62 for engagement by a holder when the same is properly inserted in the support 48. The switch is normally open, and adapted to be closed by virtue of a sample holder depressing the switch button. Electrical conductors connect the switch to other electrical parts and to a source of electrical power, as will subsequently by described.

Two platforms 80 and 82 are arranged in the cabinet 12 on opposite sides of the support 48. A pair of guide sleeves 84 are secured to the bottom of each platform at each end thereof for slidable mounting on the guide rods 32 and 34. Respective right and left-hand threaded nuts 86 and 88 are secured to the platforms 80 and 82 centrally on their bottom surfaces by bolts or screws 90. The adjusting screw 36 extends through the nuts, and the nuts are threadedly engaged by the respective right and left-hand threads 44 and 46 on the screw. In this manner, the platforms are mounted for cooperative movement toward and away from the centrally disposed support 48. When the hand wheel 38 is turned in one direction, the platforms are conjointly moved equal distances towards the support. When the hand wheel is turned in the opposite direction, the platforms are conjointly moved equal distances away from the support. A pointer 92 is mounted on the front edge of one platform 82 and extends outwardly through a slot 94 in the front wall 14 of the cabinet, and the wall is provided with suitable reference graduations along the slot for indicating the positions of the platforms.

Lamp assemblies 96 and 98 are adjustably mounted on the respective platforms 80 and 82 for movement therewith. Each assembly includes a rectangular mounting plate or base 100 having longitudinal adjustment slots 102 adjacent the four corners thereof through which locking screws or bolts 104 extend into the respective platform. A support arm 106 extends through a corresponding opening in each mounting plate and is secured thereon in upright position by nuts 108. A lamp socket 110 is pivotally adjustably mounted at the top of each arm, and electrical conductors are connected to each socket. Each socket faces the support 48, and the sockets are in opposed aligned relation with one another and the centers of the openings 54 in the support. An electric lamp 114 is mounted in each socket and extends towards the support in register with its openings. In the preferred embodiment, the lamps are white 250 watt infrared heat lamps. The lamps are equidistantly spaced from opposite sides of the support, and they are moved equal distances to and from the support by operation of the hand wheel 38.

A sample sheet holder 120 (FIGURE 3) is provided for mounting an inked sheet of paper in the cabinet 12 for testing. The holder includes two plates 122 and 124 having aligned circular openings 126 and 128 therein. One plate 122 is rectangular, and the opening 126 is in the center of the plate. The remaining plate has a corresponding rectangular section and an extension 132 projecting outwardly therefrom to provide a manipulating handle for the holder. A hinge 134 secures the two plates together and accommodates opening of the same for convenient insertion of a sample sheet therebetween. Preferably, the hinge is spring-pressed to closed position to clamp a sample sheet between the plates. In this manner, an area 150 (see FIGURE 5) of the sample sheet may be exposed on both sides thereof through the plate openings.

The holder 120 is of a size and shape to facilitate removable mounting of the same in the support 48. The hinged end of the holder is inserted from the front between the support sides 50 and 52, and the upper and lower longitudinal edges of the holder are received respectively in the upper and lower guide bar grooves 62. The front wall 14 of the cabinet includes a recessed wall section 146 centrally arranged in front of the holder support 48 and the lamps 114. A vertical access opening or slot 148 is provided in the recessed section in alignment with the support to facilitate slidable insertion of the sample sheet holder in the guides 62. The holder is inserted until its hinge 134 engages the switch pin 74 to close the switch, as illustrated in FIGURE 5. At this time, the plate openings 126 and 128 are arranged concentrically with the support openings 54. In this manner, the central area 150 of a well supported sample sheet is exposed to the heat lamps 114, with each side of the area being exposed to one of the lamps.

The handle extension 126 on the sample sheet holder projects outwardly from the recessed wall section 146 while remaining within the recess and not projecting beyond the remainder of the front wall 14. The recessed wall section is provided with colored glass windows 152 on each side of the access opening 148 to accommodate viewing of sample sheets during tests.

The apparatus is connected to a source of electrical power, preferably through a constant voltage transformer (not shown) to avoid fluctuations in the voltage. The transformer in turn supplies a variable autotransformer 154 mounted on the end wall 20 above the hand wheel 38, and the auto transformer is connected to the microswitch 70 and the lamp sockets 96–98, and also to a voltmeter 158, an automatic timer 160, a main switch 162 and an indicator light 163, all of which are mounted on the cabinet front wall 14. With the main switch 162 closed, the circuit to the lamps 114 is closed by the microswitch 70 when the holder 120 is inserted as shown in FIGURE 5. As the switch 70 is closed by the holder, the heat lamps and the timer are energized. When the holder is withdrawn, the circuit is opened by the microswitch, de-energizing the lamps and stopping the timer.

The amount of heat applied to the sample may be varied by adjusting the applied voltage of the autotransformer 154 (as indicated by the voltmeter 158) and/or by adjusting the spacing of the lamps 114 from the sample (as indicated by the pointer 92).

To conduct a test, it is necessary to apply ink to a sample sheet, and to provide consistently accurate test results, we have determined the necessity for application of a predetermined amount of ink at a predetermined pressure. Referring to FIGURES 6 and 7, we have shown a preferred embodiment of an inking device which cooperates with the sample sheet holder 120. The inking device includes a base 166 having a standard 168 secured thereon. Two sample holder mounting bars 170 are adjustably mounted above the base by means of nut and bolt fasteners 172. The bars are horizontally arranged in spaced parallel relation and extend in the direction of the standard. Two locator pins 174 extend upwardly from the base on opposite sides of the standard and inwardly therefrom. The holder 120 may be mounted on the bars 170 in a horizontal position with its hinge end against the locator pins, as illustrated in phantom lines in FIGURE 6.

A circular platen 176 is mounted in fixed position above the base 166 at approximately the level of the holder mounting bars 170 in a position to align with the central openings in the holder. A mating circular platen 178 is mounted above the fixed platen for vertical reciprocation toward and away from the same. Rubber inking pads or blankets 180 and 182 are secured on the facing surfaces of the two platens.

The movable platen 178 is carried by an operating head 186 mounted on the standard 168. The head includes a pair of outwardly projecting arms 188 pivotally mounted on the standard by a pivot pin 190 extending through the upper end thereof. The arms are secured to a spindle holder 192 that extends over the fixed platen 176. A bracket 194 is secured to the standard and extends beneath the rearward portions of the operating head. A stop bolt 196 is adjustably secured to the bracket, and the head normally is seated thereon. A bracket 198 is mounted on the upper end of the standard and extends rearwardly therefrom. A toggle clamp 200 mounted on the bracket comprises a movable rod 202 which is connected to the lower ends of rearwardly and downwardly projecting portions of the arms 188 and to a handle 204. The handle is moved forwardly to exert tension on the rod and clamp the operating head 186 in the illustrated printing position, seated on the stop bolt 196. The handle may be moved rearwardly to release the clamp and permit upward movement of the head about the pivot pin 190 to facilitate access to the printing members.

A cylindrical spindle 206 is slidably mounted in the spindle holder, for vertical reciprocal movement therein in the illustrated printing position. Stop members 207 and 209 are vertically adjustably mounted on the spindle above and below the holder, for limiting travel of the spindle. A rack 208 is formed on the upper rearward portion of the spindle. A shaft 210 is rotatably mounted on the spindle holder, and a pinion 212 is secured thereto in engagement with the rack. The shaft extends outwardly from the spindle holder, and an operating handle 214 is secured to the outer end of the shaft. A torsion spring 216 is mounted on the shaft between the handle and the spindle holder normally to retain the spindle in raised position, and the operating handle is manually moved to lower the spindle. A secondary handle 218 is mounted on the opposite side of the spindle holder for the convenience of the operator.

A cylindrical bore 222 is provided in the lower end of the spindle, and a guide rod 220 is slidably mounted therein and projects downwardly therefrom. The movable platen 178 is fixed to the lower end of the rod, and the rod and platen are biased downwardly by a compression spring 224 mounted in the bore 222. A reduced tapped bore 226 is provided in the upper end of the spindle and an adjusting rod 228 is threaded in said bore. A disk 230 secured to the lower end of the adjusting rod bears on the upper end of the spring 224, for facilitating adjustment of the spring pressure applied to the platen 178. The adjusting rod is suitably locked in adjusted position by an external lock nut 232.

In inking sample sheets, the toggle clamp handle 204 is moved to release the clamp 200, and the spindle holder 192 is raised to horizontal position. The testing ink is distributed evenly on a glass plate with a rubber brayer, and the ink is transferred from the plate to the inking pads or blankets 180 and 182. In a representative embodiment, the pads and their platens have a diameter of 2 inches and ½ cubic centimeter of ink is applied to the pads for each test. The sample sheet holder 120 having a sheet of paper clamped therein is mounted on the mounting bars 170, and the toggle clamp handle 204 is moved to restore the spindle holder to the illustrated position with the spindle vertical. The operating handle 214 is moved forwardly to lower the spindle and the movable platen 178 to cause the pad 182 to press against the upper surface of the sample sheet and to press the lower surface of the sample sheet against the pad 180. A predetermined inking pressure is applied to the sheet, as controlled by the compression spring 224, which pressure is not critical as long as it is uniform for all samples. In this manner, a film of ink is uniformly applied to each surface of the exposed area 150 of the sample sheet. The operating handle is then moved to the rear to raise the spindle and the movable platen, and the toggle clamp 200 may be released and the spindle holder 192 raised. The sample sheet holder bearing the freshly inked paper may then be removed from the inking press and inserted into the testing apparatus.

The lamps 114 are placed in predetermined positions relative to the holder support 48, by means of the hand wheel 38 as indicated by the pointer 92. In a representative embodiment, the distance between each lamp and a sample sheet mounted in the holder support can be varied from 0 to 3 inches, and is preferably about ½ inch. The voltage applied to the lamps is adjusted to a predetermined value by means of the autotransformer 154, as indicated by the voltmeter 158, and the timer 160 is set to zero.

With the main switch 162 closed, the sample sheet holder 120 bearing the inked sample is inserted through the access opening 148 into the grooves 62 in the holder support. The holder is inserted until the switch pin 74 is engaged thereby to close the microswitch 70. When the switch closes, the lamps are energized and the timer is started. The operator observes the inked area of the sample through the windows 152. When the first blister appears, the sample sheet holder is immediately withdrawn, stopping the timer and de-energizing the lamps. Ink fumes may be removed from the cabinet by means of an exhaust fan, not shown, which may be operated only after a test and not during testing.

The time required for blistering, as indicated by the timer, is a valuable criterion of the blistering characteristics of the sample. Employing two 250 watt white infrared heat lamps under a constant applied voltage of 110 volts, with the lamps situated at a distance of ½ inch from the sides of the sample sheet, and with the remaining conditions as described above, blistering generally occurs in less than 10 second. The consistently accurate nature of the results is revealed by a deviation of only 200 milliseconds in the time of blistering on a variety of samples.

The time required for blistering has been determined to be an accurate indicia of the characteristics of printing papers. However, if desired, particularly when several grades or basis weights of paper are to be compared, the temperature of blistering may be utilized as the test criterion. In such case, a thermocouple 250 (FIGURE 5) is inserted adjacent the printed surface area of the sample sheet. When the first blister appears, the temperature is read from a galvanometer 251 connected to the thermocouple and appropriately mounted on the face of the cabinet 12. As a further alternative, the size and number of blisters occurring in a predetermined time (as measured by the timer) may be utilized as a subjective evaluation of blistering.

The invention thus provides an accurate test method and apparatus which furnish a reliable indication of the blistering characteristics of printing paper. The method and apparatus are simple, convenient and economical, and they are well suited for testing large numbers of samples. The complete test procedure may be conducted routinely by technicians.

While preferred embodiments of our new method and apparatus have been described and illustrated, it will be apparent that various changes and modifications may be made therein without departing from the scope of the invention, as defined by the appended claims.

We claim:

1. A method of testing printing paper for blistering characteristics which comprises applying a predetermined amount of ink at a predetermined pressure to an area of a sheet of paper, exposing the inked area to heat of predetermined intensity, continuing said exposure until blistering occurs, and measuring a physical property which is determinative of said blistering characteristics.

2. A method of testing printing paper for blistering characteristics which comprises applying a predetermined amount of ink at a predetermined pressure simultaneously to both surfaces of an area of a sample sheet of paper, simultaneously exposing both surfaces of the inked area to external heat of constant predetermined intensity, continuing said exposure until blistering occurs, and measuring a physical property which is determinative of said blistering characteristics.

3. A method of testing printing paper for blistering characteristics which comprises applying a predetermined amount of ink at a predetermined pressure to an area of a sheet of paper, exposing the inked area to heat of predetermined intensity, and measuring the time required for blistering to occur.

4. A method of testing printing paper for blistering characteristics which comprises applying a predetermined amount of ink at a predetermined pressure to an area of a sheet of paper, exposing the inked area to heat of predetermined intensity, and measuring the sheet temperature at the time blistering occurs.

5. A method of testing printing paper for blistering characteristics which comprises applying a predetermined amount of ink at a predetermined pressure to an area of a sheet of paper, exposing the inked area to heat of predetermined intensity for a predetermined interval of time, and measuring the resulting degree of blistering.

6. Apparatus for testing printing paper for blistering which comprises portable means for holding a sample sheet of paper with both sides of the sheet exposed, a support removably mounting said holding means with both sides of the sheet exposed, a pair of heat sources, means mounting said support and said heat sources with the heat sources in opposed relation to opposite sides of the support for simultaneously exposing both sides of a sheet on said support to said heat sources, and means for measuring at least one of the duration of exposure of the sample sheet to said heat sources and the temperature of the sample sheet.

7. Apparatus as set forth in claim 6, including means for adjusting the relative positions of said support and said heat sources to adjust the heat intensity on the sheet.

8. Apparatus as set forth in claim 6, including means for simultaneously and equally adjusting the heat intensity of said sources.

9. Apparatus as set forth in claim 6, including timer means connected in series circuit with said heat sources for measuring the duration of energization thereof.

10. Apparatus as set forth in claim 6, including means at said support for measuring the temperature at the surface of the sample sheet.

11. Apparatus for testing printing paper for blistering which comprises a holder for holding a sample sheet thereon with both sides of the sheet exposed, a support for removably mounting said holder with said sides exposed, a pair of electrical heat lamps, means mounting said supporting said heat lamps with the lamps in opposed relation to opposite sides of the support for simultaneously exposing both sides of a sample sheet mounted on the support to said lamps, means for cooperatively moving said lamps to and from said support for adjusting the spacing of the lamps equally from both sides of the sheet, means for adjusting the voltage applied to said lamps to adjust the intensity of heat emitted therefrom, and electric timer means connected in series circuit with said lamps.

12. Apparatus for testing printing paper for blistering which comprises a holder for holding a sample sheet thereon with both sides of the sheet exposed, a cabinet, a support mounted in said cabinet for removably supporting said holder in the cabinet with both sides of the sample sheet exposed, means forming an access opening in said cabinet aligned with said support for inserting said holder therethrough to mount the holder on the support, window means in said cabinet for viewing the sides of a sample sheet on said holder therein, an electric switch mounted on said support for actuation by said holder upon mounting the holder on said support, a pair of electric heat lamps movably mounted in said cabinet in opposed relation to opposite sides of said support for simultaneously exposing both sides of a sample sheet on said support to the heat of said lamps, means for cooperatively moving said lamps to and from said support for adjusting the spacing of said lamps equally from both sides of the sample sheet, means for adjusting the voltage applied to said lamps to adjust the intensity of heat emitted therefrom, and an electric timer for timing the exposure of a sample sheet to said lamps, said switch, said lamps and said timer being electrically connected in series circuit whereby said lamps and said timer are energized when said holder is placed on said support and are de-energized when said holder is removed from said support.

References Cited by the Examiner

"A.A.T.C.C. Flammability Tester," publication by United States Testing Company, Inc., January 30, 1953, pages 1–4.

RICHARD C. QUEISSER, *Primary Examiner.*

JACK C. GOLDSTEIN, *Assistant Examiner.*